H. B. BRYAN.
DIPPER.
APPLICATION FILED MAY 26, 1911.
1,015,135.
Patented Jan. 16, 1912.
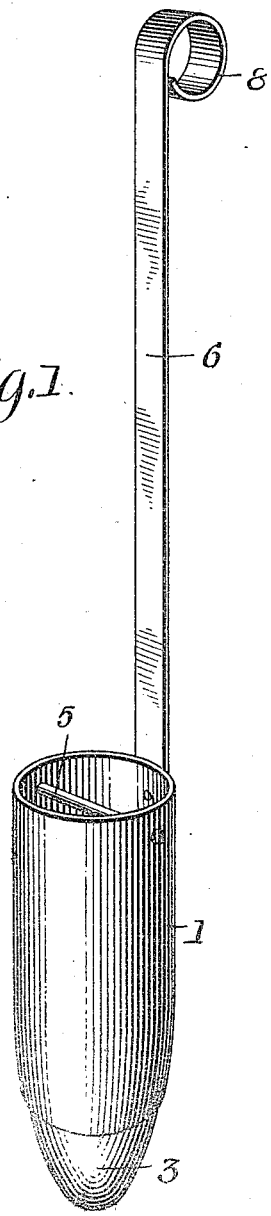
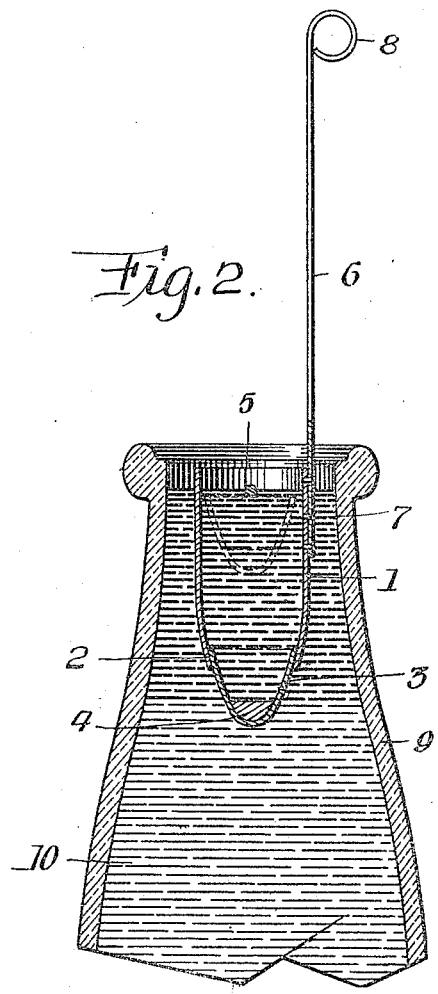
WITNESSES:
Samuel Payne.
INVENTOR.
H. B. Bryan,
BY
ATTORNEYS

UNITED STATES PATENT OFFICE.

HENRY B. BRYAN, OF PITTSBURGH, PENNSYLVANIA.

DIPPER.

1,015,135.

Specification of Letters Patent. Patented Jan. 16, 1912.

Application filed May 26, 1911. Serial No. 629,568.

*To all whom it may concern:*

Be it known that I, HENRY B. BRYAN, a citizen of the United States of America, residing at Pittsburgh, in the county of Allegheny and State of Pennsylvania, have invented certain new and useful Improvements in Dippers, of which the following is a specification, reference being had therein to the accompanying drawing.

This invention relates to dippers and the primary object of my invention is to provide a dipper that can be advantageously used for skimming or removing one fluid from the surface of another, as cream upon milk.

Another object of this invention is to furnish a dipper with a movable bottom that serves functionally as a receptacle for collecting one fluid from another in which the dipper is placed.

A further object of the invention is to provide a dipper that can be immersed in two kinds of normally separated fluids without unnecessarily disturbing or causing the fluids to commingle, the dipper being designed to remove the uppermost fluid.

With the above and other objects in view the invention resides in a novel construction to be hereinafter specifically described and then claimed.

Reference will now be had to the drawing, wherein:—

Figure 1 is a perspective view of the dipper, and Fig. 2 is a vertical sectional view of a portion of the same showing the manner of using the dipper in connection with a milk bottle or other receptacle.

The dipper comprises a cylindrical shell 1 having the lower end thereof reamed or bent inwardly to form an annular flange or seat 2 for a cup-shaped bottom or receptacle 3, which is loosely supported by the reduced end of the shell 1. The receptacle 3 has the bottom thereof weighted or enlarged, as at 4. Arranged transversely of the shell 1, adjacent to the upper edges thereof, is a bar or rod 5, said bar or rod having the ends thereof fixed in the walls of the shell 1. A suitable handle or bail 6 has the lower end thereof riveted or otherwise connected, as at 7 to the outer side of the shell 1 and the upper end of the handle or bail is bent to form a loop or finger grip 8.

As an example of the use of the dipper, there is shown a milk bottle 9 containing milk 10 and cream 11. To remove the cream or a portion thereof without disturbing the milk 10, the dipper is lowered into the bottle and as the lower end of the receptacle 3 impinges the cream, it remains upon the cream while the shell 1 passes into the cream. As the cream can enter the bottom of the shell 1, it will not be unnecessarily disturbed, and as the bar or rod 5 impinges the upper edges of the receptacle 3, the receptacle is lowered in the cream until the cream over-flows the upper edges of the receptacle and fills the same. The dipper can then be gradually withdrawn and the contents of the receptacle 3 removed from the dipper.

From the foregoing it will be observed that the receptacle 3 cannot become displaced relatively to the dipper and that as the upper fluid flows over the edges of the receptacle, a very small quantity of the fluid can be obtained if desired. This is an essential feature of the invention as the dipper can be used by chemists and pharmacists in removing solids from various solutions without disturbing the body of the solution. The dipper can also be used by gagers at distilleries for testing and removing quantities of liquor from barrels, and it is in this connection that the bar or rod 5 can be positioned or adjusted whereby the dipper can be used for various purposes.

It is preferable to make the dipper in its entirety of light and durable aluminum or non-corrosive metal, it being obvious that the dipper can be made of different sizes and shapes.

What I claim is:—

1. A dipper of the type described comprising a cylindrical shell having a reduced end, a cup-shaped receptacle movably mounted in said shell and adapted to seat in the reduced end of said shell, and a bar arranged transversely of said shell and adapted to retain said receptacle therein.

2. A dipper comprising a cylindrical shell having a lower reduced end, a cup-shaped weighted receptacle adapted to seat in the reduced lower end of said shell, a handle carried by said dipper, and means arranged in the upper end of said shell and adapted to limit the upward movement of said receptacle within said shell.

In testimony whereof I affix my signature in the presence of two witnesses.

HENRY B. BRYAN.

Witnesses:
　ISABELLE N. BRYAN,
　M. HELEN BRYAN.